United States Patent
Lee (10) Patent No.: US 7,570,833 B2
(45) Date of Patent: Aug. 4, 2009

(54) REMOVAL OF POISSON FALSE COLOR NOISE IN LOW-LIGHT IMAGES USNG TIME-DOMAIN MEAN AND VARIANCE MEASUREMENTS

(75) Inventor: Seong-Won Lee, Seongnam-si (KR)

(73) Assignee: Nextchip Co., Ltd., Seoul (KR)

( * ) Notice: Subject to any disclaimer, the term of this patent is extended or adjusted under 35 U.S.C. 154(b) by 623 days.

(21) Appl. No.: 11/336,290

(22) Filed: Jan. 20, 2006

(65) Prior Publication Data

US 2008/0144958 A1    Jun. 19, 2008

(30) Foreign Application Priority Data

Oct. 11, 2005    (KR) ............... 10-2005-0095269

(51) Int. Cl.
    G06K 9/40      (2006.01)
    G06F 17/10     (2006.01)
    H04N 5/225     (2006.01)
(52) U.S. Cl. ............... 382/260; 382/262; 708/300; 708/304; 348/216.1
(58) Field of Classification Search .......... None
    See application file for complete search history.

(56) References Cited

U.S. PATENT DOCUMENTS

| 5,442,407 | A * | 8/1995 | Iu .................. | 348/620 |
| 5,768,440 | A * | 6/1998 | Campanelli et al. ........ | 382/261 |
| 5,771,318 | A * | 6/1998 | Fang et al. ............ | 382/261 |
| 6,295,382 | B1 * | 9/2001 | Karanovic ............ | 382/261 |
| 2004/0028289 | A1 * | 2/2004 | Le Meur et al. ........... | 382/275 |
| 2004/0179108 | A1 * | 9/2004 | Sorek et al. ............ | 348/216.1 |
| 2006/0055985 | A1 * | 3/2006 | Ikeda ................ | 358/463 |

OTHER PUBLICATIONS

Sohn, K., et al. (Nov. 2001) "Impulsive noise filtering based on noise detection in corrupted digital color images." Circuits, Systems, and Signal Processing, vol. 20 No. 6, pp. 643-654.*

(Continued)

Primary Examiner—Brian P Werner
Assistant Examiner—Barry Drennan
(74) Attorney, Agent, or Firm—Ladas & Parry LLP (57) ABSTRACT

Disclosed are an image processing method capable of effectively removing noise contained in an image photographed in a low light environment by using statistical information, and a system thereof. There is provided an image processing method for an image consecutively inputted per frame unit, the method comprising: a step of segmenting the image into unit areas comprising a predetermined number of pixels; a first step of dividing each unit area into a low light region or a high light region by using the brightness of image data contained in said each unit area; a second step of outputting statistical information from image data contained in at least one unit area divided into the low light region, and detecting and removing Poisson and photon counting noise on the basis of the statistical information, the statistical information being the mean of the unit area; a third step of detecting a motion pixel from the image data; and a fourth step of detecting and removing false color noise from the image data on the basis of the detected motion pixel and the statistical information.

9 Claims, 6 Drawing Sheets

OTHER PUBLICATIONS

Rangayyan, R.M., et al. (Jul. 1998) "Adaptive-neighborhood filtering of images corrupted by signal-dependent noise." Applied Optics, vol. 37 No. 20, pp. 4477-4487.*

Lee, S-W., et al. (Jan. 2005) "Segmentation-based adaptive spatio-temporal filtering for noise canceling and MPEG pre-processing." Int'l Conf. on Consumer Electronics 2005, pp. 359-360.*

'Noise-Adaptive Spatio-Temporal Filter for Real-Time Noise Removal in Low Light Images' Lee et al., IEEE Transactions on Consumer Electronics, vol. 51, No. 2, May 2005, pp. 648-653.

AT4022 NoiseMaster II, Pentamicro Inc., Nov. 29, 2002.

* cited by examiner

REMOVAL OF POISSON FALSE COLOR NOISE IN LOW-LIGHT IMAGES USNG TIME-DOMAIN MEAN AND VARIANCE MEASUREMENTS

CROSS-REFERENCE TO RELATED APPLICATIONS

This application claims the benefit of Korean Patent Application No. 2005-95269, filed on Oct. 11, 2005, in the Korean Intellectual Property Office, the disclosure of which is incorporated herein in its entirety by reference.

BACKGROUND OF THE INVENTION

1. Field of the Invention

The present invention relates to an image processing method and apparatus, and more particularly, to an image processing method capable of effectively removing noise contained in an image photographed in a low light environment by using statistical information, and a system thereof.

2. Description of the Related Art

Today, owing to the development of video technology, video multimedia is being developed in which high performance cameras, digital cameras, closed-circuit televisions (CCTVs), video capture systems, and the like can take a picture and store various images.

However, in the case an image compressed from various formats as above or a transmitted image is photographed in a low light environment, noise contained in the image may deteriorate its quality and also decrease its ability to be compressed effectively.

Noise that matters in a low light environment includes Poisson and photon counting noise and false color noise.

Figure 1:
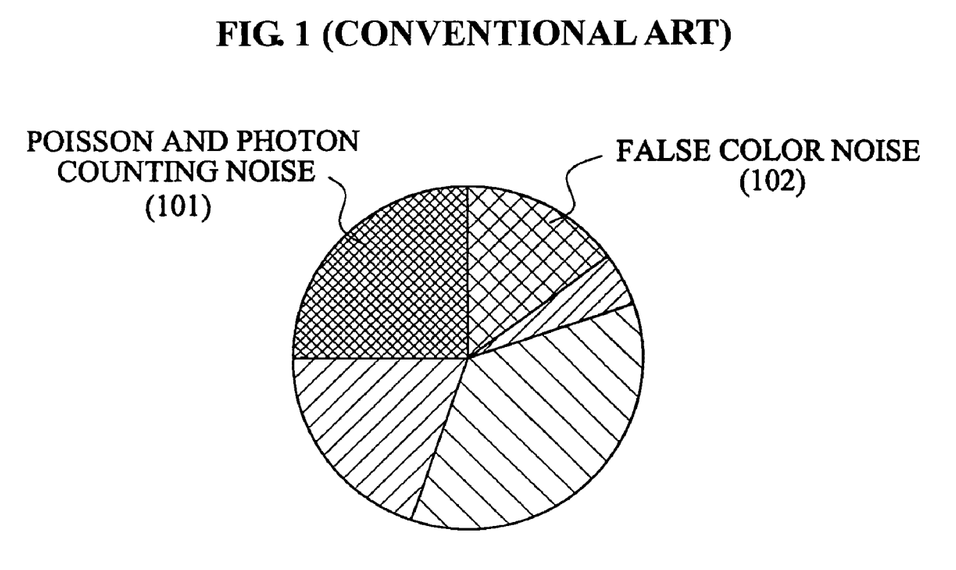
FIG. 1 is a view illustrating a configuration of noise contained in an image photographed with a video camera.

FIG. 1 is a view illustrating a configuration of noise contained in an image photographed with a video camera. Referring to FIG. 1, in an image photographed with a conventional video camera, Poisson and photon counting noise 101 and false color noise 102 takes large portion of the entire noise.

Poisson and photon counting noise and false color noise is noise associated with the inconsecutive properties of an image capturing device, when an image is photographed in a low light environment. The distribution thereof is normal or similar to Gaussian distribution.

Figure 2:
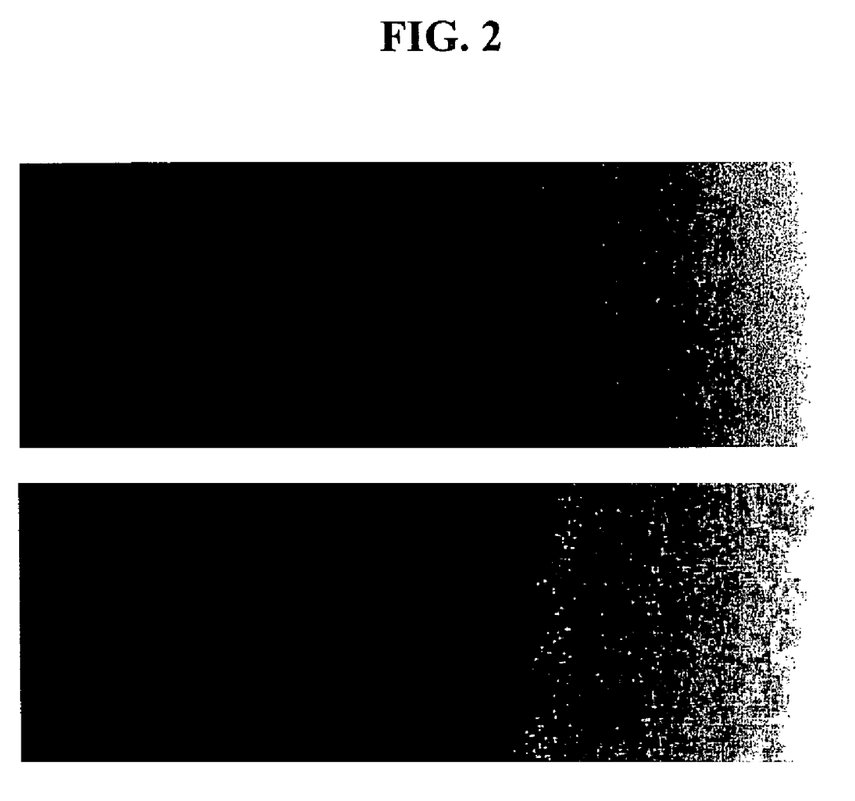
FIG. 2 is a view illustrating an example of false color noise.

False color noise is noise distributed in all color factors, deteriorates the quality of an image, and introduces a large error in motion compensation of most video coding algorithms. FIG. 2 is a view illustrating an example of false color noise. Referring to FIG. 2, false color noise is distributed in almost all color factors.

A pixel that has been affected by false color noise may contribute to a deteriorated compression ratio. Thus, it is important to remove the false color noise in an image before compressing the image.

A method of simultaneously using a spatial filter and a temporal filter has been suggested to remove the noise described above. The filter as above is a spatio-temporal filter.

However, a conventional spatio-temporal filtering method removes only one type of noise from a plurality of noises. Also, smearing occurs in an area without noise, which deteriorates the quality of an image.

Also, unlike impulsive noise, Poisson and photon counting noise contains both uncorrelated and correlated noise occurring in the same region. However, the conventional filtering method determined Poisson and photon counting noise inaccurately. Also, the filtering method itself was ineffective.

SUMMARY OF THE INVENTION

The present invention provides an image processing method and system for detecting and removing Poisson and photon counting noise and false color noise contained in an image that is photographed in a low light environment.

The present invention also provides an image processing method and system for detecting and removing Poisson and photon counting noise and false color noise while maintaining edge and detailed information contained in an image.

The present invention also provides an image processing method and system for quickly and effectively removing noise by using statistical information.

The present invention also provides an image processing method and system for removing both uncorrelated and correlated noise by using the mean calculated for each unit area.

To achieve the above objectives and solve the problems in the conventional art, according to an aspect of the present invention, there is provided an image processing method for an image consecutively inputted per frame unit, the method comprising: a step of segmenting the image into unit areas comprising a predetermined number of pixels; a first step of dividing each unit area into a low light region or a high light region by using the brightness of image data contained in said each unit area; a second step of outputting statistical information from image data contained in at least one unit area divided into the low light region, and detecting and removing Poisson and photon counting noise on the basis of the statistical information, the statistical information being the mean of the unit area; a third step of detecting a motion pixel from the image data; and a fourth step of detecting and removing false color noise from the image data on the basis of the detected motion pixel and the statistical information.

According to another aspect of the present invention, there is provided an image processing system for an image consecutively inputted per frame unit, the system comprising: a segment module segmenting the image into unit areas comprising the predetermined number of pixels and dividing each unit area into a low light region or a high light region by using the brightness of image data contained in said each unit area; a spatial hybrid filter outputting statistical information from image data contained in at least one unit area divided into the low light region, and detecting and removing Poisson and photon counting noise on the basis of the statistical information, the statistical information being the mean of the unit area; a motion detector detecting a motion pixel from the image data; and a statistical domain temporal filter detecting and removing false color noise from the image data on the basis of the detected motion pixel and the statistical information.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, an image processing method and system according to the present invention will be described in detail with reference to the accompanying drawings.

The image processing system according to the present embodiment is used to effectively remove Poisson and photon counting noise and false color noise in an image. In this instance, since the image is photographed in a low light image, the image source itself is not clear.

Figure 3:
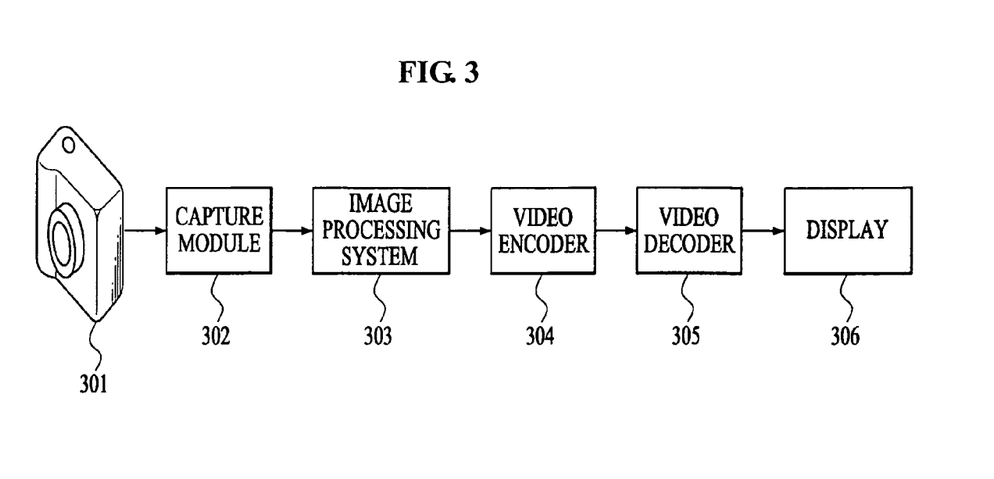
FIG. 3 is a view illustrating an image processing system of the present invention used as a prefilter.

FIG. 3 is a view illustrating an image processing system of the present invention used as a prefilter. An image photographed with a camera 301 is captured in a capture module 302, and an image processing system 303 including a noise removing system according to the present invention prefilters the image, so as to remove noise. This is to obtain a good quality image and improve the compressibility before the image is encoded to be digitized or compressed by a video encoder 304.

The image encoded by the video encoder 304 may be stored in a storage space of the system or transmitted to a remote system via a network. The image stored in the storage space or the image transmitted to the remote system or the image transmitted to the remote system to be stored therein may be decoded by a video decoder 305 and displayed on a predetermined display 306. In this case, FIG. 3 illustrates the image processing system 303 according to the present invention is used as a prefilter, but it is only an example. The present invention may be widely used to effectively remove noise in a photographed image and improve its resolution.

Figure 4:
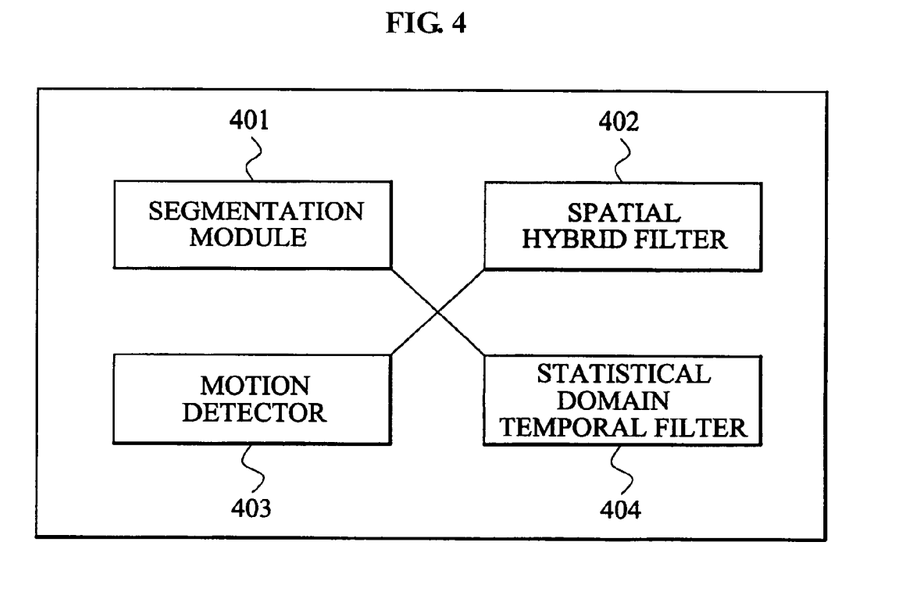
FIG. 4 is a block diagram illustrating an image processing system according to an embodiment of the present invention.

Hereinafter, the operations of an image processing system according to the present embodiment will be described in further detail with reference to FIG. 4. FIG. 4 is a block diagram illustrating the image processing system according to an embodiment of the present invention.

In FIG. 4, the image processing system according to the present invention includes a segmentation module 401, a spatial hybrid filter 402, a motion detector 403, and a statistical domain temporal filter 404.

The present invention suggests noise adaptive spatio-temporal (NAST) filtering removing noise in an image photographed in a low light environment. The NAST filtering includes a statistical domain temporal filter 404 for a motion area and a spatial hybrid filter 402 for a static area.

The segmentation module 401 segments an image inputted in the image processing system into unit areas comprising a predetermined number of pixels. Also, the segmentation module 401 divides each unit area into a low light region or a high light region by using the brightness of the image data contained in said each unit area. Also, a contrast value of each pixel may be used to determine the brightness. In the present specification, "image data belonging to an area containing a segment divided into the low light region" may be referenced as "image data". Also, an image referenced as "the entire image" contains both the low light region and the high light region, which is an image inputted into the noise removing system. This is to distinguish image data belonging to the low light region or the high light region.

Accordingly, the image data may be just a part of the entire image or the entire image itself.

The spatial hybrid filter 402 outputs statistical information from image data contained in at least one unit area divided into the low light region, and removes Poisson and photon counting noise on the basis of the statistical information. In this instance, the statistical information is outputted for each unit area and includes the mean or variance of the unit area.

The motion detector 403 detects a motion pixel from the image data.

The spatial hybrid filter 402 detects and removes false color noise from the image data on the basis of the detected motion pixel and the statistical information.

Hereinafter, the operations of each component of the image processing system, as illustrated in FIG. 4, will be described in further detail with reference to FIG. 5.

Figure 5:
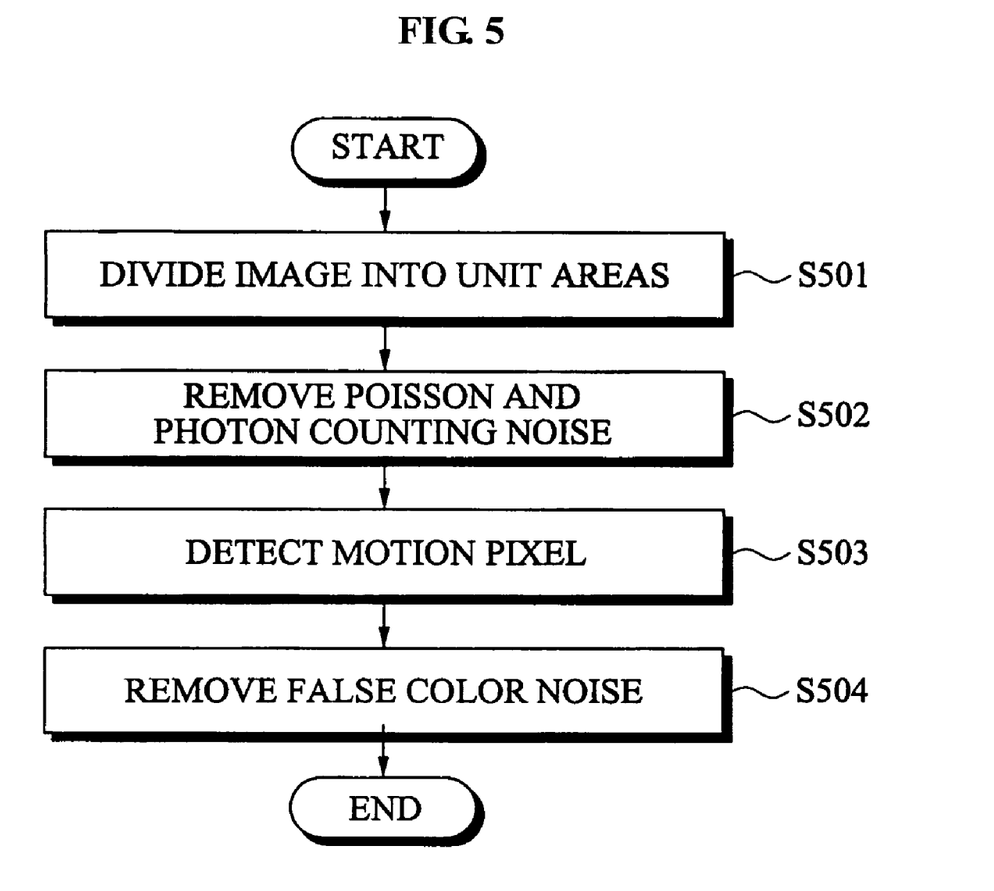
FIG. 5 is a flowchart illustrating procedures of processing an image according to an embodiment of the present invention.

FIG. 5 is a flowchart illustrating procedures of processing an image according to an embodiment of the present invention.

In step S501, when an image is sequentially inputted for each frame, the segmentation module 401 divides the entire image into unit areas comprising a predetermined number of pixels. For example, an image photographed with the camera 301 may be inputted into the image processing system with a frame rate of 15 [frame/sec].

The size of the unit area the segmentation module 401 divides the entire image into may be determined by considering the processing effectiveness and the required preciseness. For example, the segmentation module 401 may divide the entire image into unit areas of 3×3 pixels.

In step S502, the segmentation module 401 recognizes the brightness of image data contained in each unit area, and divides it into a high light region and a low light region.

In this instance, the segmentation module 401 calculates the mean pixel value of pixels contained in unit area W, $\bar{x}(i, j)$, and the mean absolute deviation thereof, $\sigma(i, j)$. Also, the segmentation module 401 calculates a contrast value of each pixel and divides the unit area W into the high light region and the low light region by using the calculated contrast value. In this case, contrast value $C(i, j)$ in coordinates $(i, j)$ is calculated as, $$C(i, j) = \sigma(i, j) + \bar{x}(i, j) \qquad \text{[Equation 1]}$$

Figure 6:
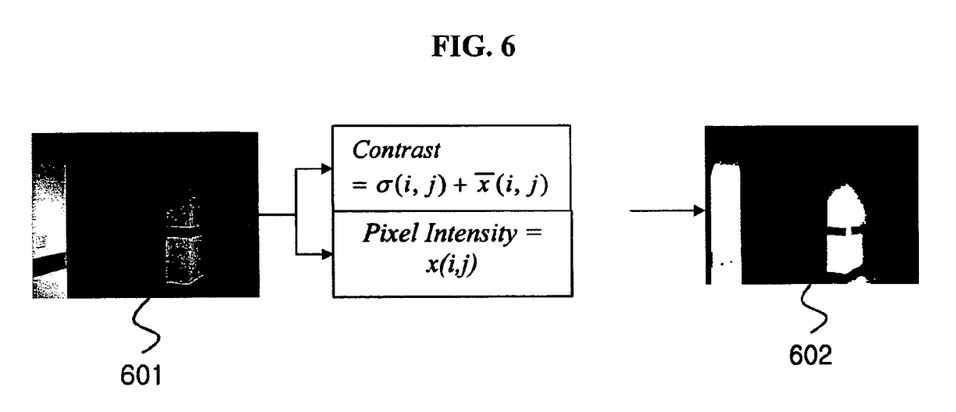
FIG. 6 is a view illustrating the entire image divided into a high light region and a low light region by a segmentation module of the present invention.

FIG. 6 is a view illustrating the entire image divided into a high light region and a low light region by the segmentation module 401. Drawing symbol 601 indicates the entire image, and drawing symbol 602 indicates the image divided into the high light region and the low light region. In this instance, in drawing symbol 602, the black colored part is for the low light region and the white colored part is for the high light region.

In this case, the image processing system may omit image processing for image data contained in the area divided into the high light region and perform image processing, such as removing noise, only for image data contained in the area divided into the low light region. Through this, it is possible to improving the effectiveness of calculation for processing the entire image. Namely, according to the present invention, an image area that needs to be processed by the image processing system decreases. Thus, time can be saved in calculations. Also, it is possible to guarantee that noise can be sufficiently removed by performing image processing only for image data contained in the low light region that contains a lot of noise. In particular, according to the present embodiment, image processing may be omitted for image data contained in the high light region. Thus, it is possible to prevent blurriness caused by noise filtering in a high-quality image contained in the high light region. Accordingly, according to the present invention, it is possible to maintain edge and detailed information on an image in a high light region for improved image quality and effective signal processing.

In the step S502, the spatial hybrid filter 402 outputs statistical information from image data contained in at least one unit area divided into the low light region by the segmentation module 401. The spatial hybrid filter 402 detects and removes Poisson and photon counting noise on the basis of the statistical information.

In this instance, the image processing system divides image data into predetermined unit areas. Also, the image processing system detects whether there is a pixel containing uncorrelated noise in Poisson and photon counting noise in each unit area by using a threshold and statistical information outputted in each unit area.

In the present specification, a pixel containing uncorrelated noise in Poisson and photon counting noise is referred as a "first pixel".

Statistical information calculated in each unit area includes the mean of pixel values of pixels contained in each unit area. A process of detecting a first pixel by using statistical information and a threshold will be described.

A first pixel is detected by comparing the absolute difference between x(i, j) and $S_N$(i, j). In this instance, x(i, j) is a pixel value of a pixel contained in a unit area as in equation 2, and $S_N$(i, j) is a statistical value for each unit area.

As a result, a pixel determined as a first pixel is set as n(i, j)=1 and a pixel not determined as a first pixel is set as n(i, j)=0, which makes it possible to generate a binary map of the noise throughout the low light region. The binary noise map may be used to filter uncorrelated noise and set up a point for filtering correlated noise.

$$n(i, j) = \begin{cases} 1, & |x(i, j) - S_N(i, j)| > T_N \\ 0, & |x(i, j) - S_N(i, j)| \le T_N \end{cases} \quad \text{[Equation 2]}$$

In this case, $S_N$(i, j) is a statistical value for each unit area which is a standard to detect noise, and also a median value of absolute deviation. In the unit area W where pixel (i, j) is positioned at the center thereof, $S_N$(i, j) has equation 3 as, $$S_N(i, j) = \text{median}\{|x(i, j) - \bar{x}(i, j)| \, | \, x(i, j) \in W\} \quad \text{[Equation 3]}$$

In this case, x(i, j) is a pixel value in coordinates (i, j), and $\bar{x}$(i, j) is the mean of unit area W containing coordinates (i, j). Accordingly, a statistical value for each unit area, $S_N$(i, j), is calculated by using statistical information. Experimentally, good results may be provided when the threshold is in a rage of $0 < T_N < 30$.

Figure 7:
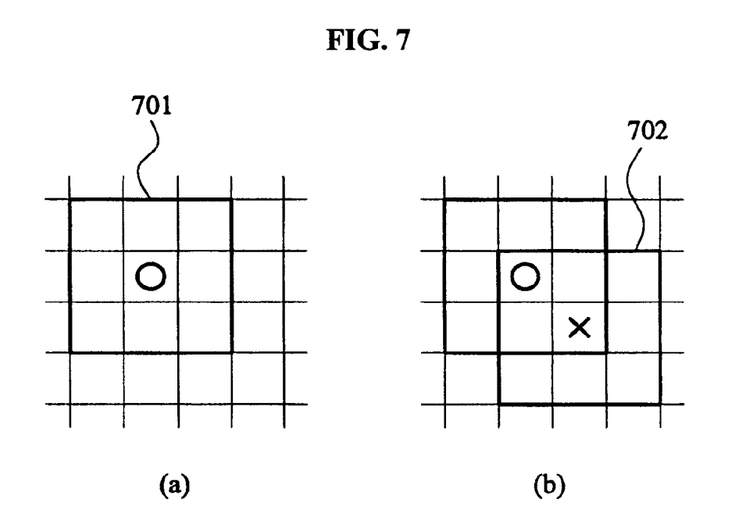
FIG. 7 is a view illustrating an embodiment of the unit area of an image processed according to the present invention.

FIG. 7 is a view illustrating an embodiment of the unit area of an image processed according to the present invention. Referring to FIG. 7, the image processing system according to the present invention calculates $S_N$(i, j), which is a statistical value, for each unit area 701 where pixel (i, j) is positioned at the center thereof. The statistical value is calculated with respect to both unit areas 701 and 702 contained in a low light region.

In the case a pixel positioned at the center of the unit area W is determined as a first pixel, for example, in the case of n(i, j)=1 on binary map of the noise N, the image processing system applies a median filter to the first pixel which substitutes a pixel value of the first pixel with a median value of the unit area containing the first pixel. y(i, j) is a pixel value in which noise of the first pixel in coordinates (i, j) is removed, and has equation 4 as, $$y(i, j) = n(i, j) \times \hat{x}(i, j) + (1 - n(i, j)) \times x(i, j) \quad \text{[Equation 4]}$$

In this case, $\hat{x}$(i, j) is a pixel value filtered by the spatial hybrid filter performing the step of S502, and has a value of $\hat{x}$(i, j)=median$\{x(i,j) | x(i,j) \in W\}$ for n(i,j)=1.

x(i, j) is an original pixel value in coordinates (i, j), and n(i, j) is the results of noise detection by the equation 2. Referring to equation 4, after performing the step S502, a pixel value of coordinates whose uncorrelated noise has been detected is substituted with a pixel value corrected by spatial hybrid filtering. Also, a pixel value of coordinates whose uncorrelated noise has not been detected is not changed.

Next, the image processing system removes correlated noise by applying an adaptive low pass filter to a second pixel adjacent to the first pixel. The second pixel adjacent to the first pixel is x(i, j) which is n(i, j)≠1. Also, the second pixel is n(k, l)=1 in at least one pixel belonging to the unit area W where the second pixel is contained. For example, in the case a pixel positioned in the center of a unit area is not a first pixel, but the first pixel is adjacent to the pixel, the pixel positioned in the center of the unit area is a pixel containing correlated noise. Thus, an adaptive low pass filter is applied.

x'(i, j) is a pixel value in which correlated noise is removed by applying a mean-variance filter to a second filter, and has equation 5 as, $$x'(i, j) = \frac{\sigma^2(i, j) \times x(i, j) + \bar{x}^2(i, j)}{\sigma(i, j) + \bar{x}(i, j)} \quad \text{[Equation 5]}$$

In this case, $\bar{x}$(i, j) is the mean in the unit area W, and $\sigma^2$(i, j) is the variance in the unit area W.

As a result of the application of equation 5, the variance has a small value, $\sigma(i, j) \approx 0$, in a homogenous area where contrast of a group of pixels changes little. Accordingly, x'(i, j) has a value approximate to $\bar{x}$(i, j) which is the mean of the unit area.

On the other hand, the variance has a large value in a non-homogenous area such as edge and detailed information where contrast changes a lot and x'(i, j) "is approximately the same as $\bar{x}$(i, j). Accordingly, edge and detailed information is maintained in an area adjacent to the first pixel.

In this instance, the mean-variance filter brings the results of equation 5, and the adaptive low pass filter is substantially more convenient to be embodied than the mean-variance filter. Accordingly, results of removing correlated noise of the second pixel contained in the unit area W by the adaptive low pass filter have equation 6 as, $$\hat{x}(i, j) = \begin{cases} \bar{x}(i, j), & \sigma(i, j) < T_D \\ x(i, j), & \sigma(i, j) \ge T_D \end{cases} \quad \text{[Equation 6]}$$

for $\{x(i, j) \, | \, n(i, j) \ne 1, n(k, l) = 1, x(k, l) \ne x(i, j)\}$

In this case, $T_n$ is a stress hold value for removing correlated noise, and may be empirically set as 1.0. The adaptive low pass filter is more convenient to be embodied than the mean-variance filter. Also, the adaptive low pass filter may effectively remove correlated noise while not changing a pixel value in a non-homogeneous area such as edge and detailed information where contrast changes a lot.

As described above, in the step S502, the image processing system removes both uncorrelated noise and correlated noise contained in Poisson and photon counting noise. In this instance, the image processing system also maintains edge and detailed information of image data.

In step S503, the motion detector 403 of the image processing system detects a motion pixel from the image data. In this step S503, the motion detector 403 detects a motion pixel by comparing the image data for each frame. At this time, the image data is consecutively inputted per frame unit. In the present embodiment, image data corresponding to an arbitrary frame is "first image data" and image data corresponding to a frame inputted right after the arbitrary frame is "second image data".

The step S503 of detecting a motion pixel is performed before removing false color noise in image data. Filtering for removing the false color noise may cause motion blur. Thus, it is preferable that the false color noise is applied only in a static area without motion pixel.

Unlike impulsive noise or Gaussian noise, in case of false color noise, it is difficult to detect false color noise with a method of comparing a pixel value of a corresponding pixel or a neighboring pixel in a frame of the image. Thus, false color noise has to be detected by comparing each frame in chronological order. Accordingly, a frame prior to a current frame should be stored in a predetermined memory means for temporary storage, so as to compare frames in chronological order, that is, consecutive frames.

Accordingly, in the case a corresponding pixel value changes in an image which is consecutively inputted, it may be a normal motion pixel or undesirable false color noise. Once a motion pixel is detected, the rest may be treated as false color noise.

In step S504, the statistical domain temporal filter 404 detects and removes false color noise from the image data on the basis of the detected motion pixel and the statistical information.

In this instance, the image processing system outputs a first area statistical value for each pixel of the first image data and outputs a second area statistical value for each pixel of the second image data, so as to detect false color noise. The present invention uses a spatially filtered image to reduce an interval of noise and detect a motion. Also, the statistical domain temporal filter 404 of the present invention uses statistical information such as the mean and the variance for each unit area which is calculated by the spatial hybrid filter 402. This is to quickly and effectively detect false color noise.

$S_T$ is an area statistical value in coordinates (i, j) when time is t, and has equation 7 defined as, $$S_T(i, j, t) = |(x(i, j, t) - \bar{x}(i, j, t))^2 - \sigma^2(i, j, t)| \qquad \text{[Equation 7]}$$

In this case, x(i, j, t) is a pixel value in coordinates (i, j) when time is t, $\bar{x}$(i, j, t) is the mean of the unit area containing coordinates (i, j) when time is t, and $\sigma^2$(i, j, t) is the variance in coordinates (i, j) when time is t.

The image processing system compares the first area statistical value and the second statistical value for each pixel by using equation 7, and selects a pixel value of image data corresponding to a smaller value. Also, the image processing system removes false color noise by substituting a pixel value of the second image data with the selected pixel value.

y(i, j, t) is a pixel value of the second image data in which false color noise is removed, and has equation 8 as, $$y(i, j, t) = \begin{cases} \hat{x}(i, j, t-1), & S_P(i, j, t) > S_P(i, j, t-1) \\ \hat{x}(i, j, t), & S_P(i, j, t) \leq S_P(i, j, t-1) \end{cases} \qquad \text{[Equation 8]}$$

In this case, $\hat{x}$(i, j, t) and $\hat{x}$(i, j, t−1) are pixel values in coordinates (i, j) of a frame spatially filtered when time is t and t−1.

As described above, the present invention removes false color noise by using statistical information outputted from the spatial hybrid filter. Accordingly, since a repeated operation is not used, the image processing system may remove false color noise quickly and effectively and be embodied easily.

Namely, two frames in memory are used to embody temporal filtering for removing false color noise in the conventional art, but according to the present invention, only one frame is required because of the use of statistical information.

As described above, the image processing system according to the present invention reduces the number of frame in memories that is needed to embody temporal filtering for removing false color noise. Accordingly, the image processing system may be compactly included in camcorders, digital cameras, mobile phone cameras, and the like.

Figure 8:
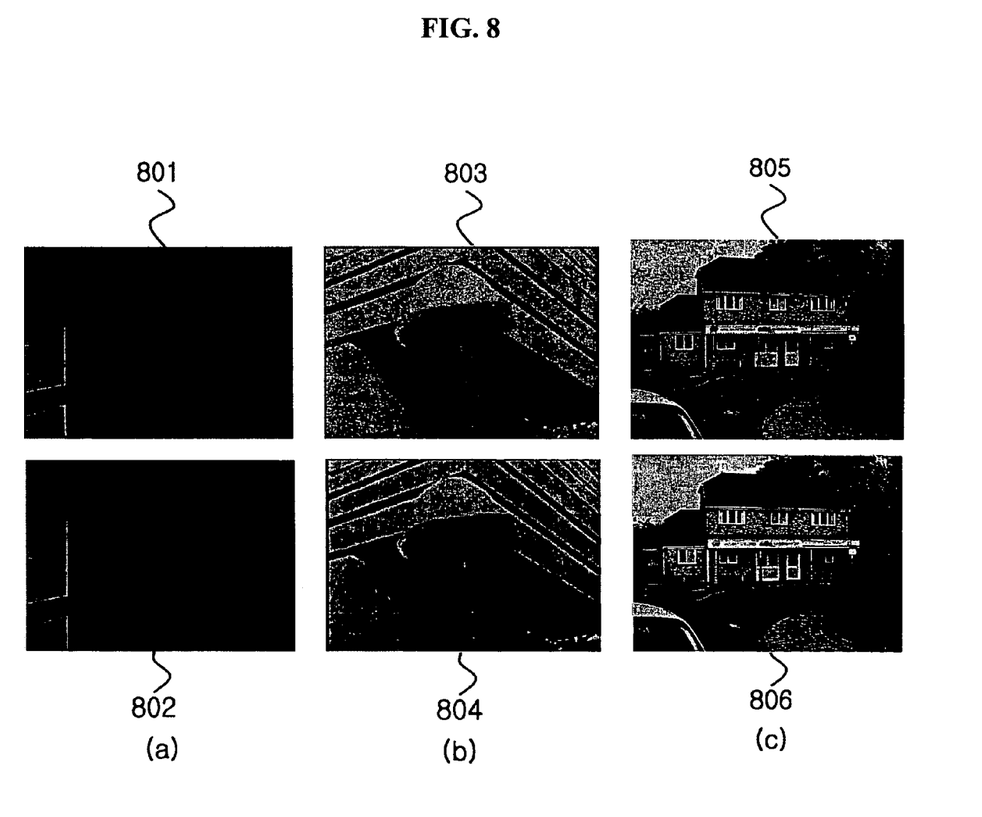
FIG. 8 is a view illustrating image processing results of the image processing method and system according to the present invention.

FIG. 8 is a view illustrating image processing results of the image processing method and system according to the present invention.

(a) of FIG. 8 shows results 802 of applying the image processing method according to the present invention to an original image 801 photographed in low light. As illustrated in (a) of FIG. 8, in the case of the low light image 801, as a result 802 of removing noise therein, noise has been removed and edge and detailed information such as a switch on the wall has been well preserved.

(b) of FIG. 8 shows results 804 of adopting the image processing method according to the present invention to an original image 803 containing 20 dB Poisson and photon counting noise. In this instance, the Poisson and photon counting noise is artificial noise. Also, (c) of FIG. 8 shows results 806 of applying the image processing method according to the present invention to an original image 805 containing 20 dB Poisson and photon counting noise and 15 dB false color noise.

Referring to FIG. 8, it is shown the spatial hybrid filter and the statistical domain temporal filter of the present invention successfully maintain edge and detailed information of an image and also effectively remove Poisson and photon counting noise and false color noise.

As described above, the image processing method and system according to the present invention determines whether to perform filtering on each pixel by using statistical information obtained for each unit area. Also, the image processing method and system performs filtering by using the statistical information. Accordingly, it is possible to maintain edge and detailed information in an image while quickly and effectively removing noise in the image.

Accordingly, since the present invention decreases peak signal to noise ratio (PSNR) of an image and effectively removes noise in the image, the compressibility of the image may be improved.

Also, the present invention may maintain detailed information on an image in a high light region for better image quality and effectiveness of image processing.

The image processing system of the present invention quickly and effectively removes noise in an image. Accordingly, the image processing system of the present invention is applicable to inexpensive camcorders, digital cameras, mobile phone cameras, CCTVs, surveillance video systems and the like.

The image processing method according to the present invention may be recorded in computer readable media including program instructions to implement various operations embodied by a computer. The media may also include, alone or in combination with the program instructions, data files, data structures, tables, and the like. The media and program instructions may be those specially designed and constructed for the purposes of the present invention, or they may be of the kind well known and available to those having skill in the computer software arts. Examples of computer-readable media include magnetic media such as hard disks, floppy disks, and magnetic tape; optical media such as CD ROM disks; magneto-optical media such as floptical disks; and hardware devices that are specially configured to store and perform program instructions, such as read-only memory devices (ROM) and random access memory (RAM). The media may also be a transmission medium such as optical or metallic lines, wave guides, etc. including a carrier wave transmitting signals specifying the program instructions, data structures, etc. Examples of program instructions include both machine code, such as produced by a compiler, and files containing higher level code that may be executed by the computer using an interpreter. The described hardware devices may be configured to act as one or more software modules in order to perform the operations of the present invention.

According to the image processing system and method of the present invention, it is possible to maintain edge and detailed information of image data while removing both correlated noise and uncorrelated noise of Poisson and photon counting noise.

Also, according to the image processing system and method of the present invention, false color noise is removed by using statistical information outputted from a spatial hybrid filter and a repeated operation is not used. Accordingly, it is possible to easily embody the system and remove the false color noise quickly and effectively.

Also, according to the image processing system and method of the present invention, it is determined whether to perform filtering on each pixel by using statistical information obtained for each unit area of an image and perform filtering by using the statistical information. Accordingly, it is possible to maintain edge and detailed information in an image while quickly and effectively removing noise.

Also, according to the image processing system and method of the present invention, PSNR of an image is decreased and noise is effectively removed. Accordingly, the compressibility of the image may be improved.

Also, according to the image processing system and method of the present invention, it is possible to maintain edge and detailed information on an image in a high light region for better image quality and effectiveness of image processing.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An image processing method for an image consecutively inputted per frame unit, the method comprising:
    a step of capturing the image with a capturing device;
    a step of segmenting the image into unit areas comprising a predetermined number of pixels;
    a first step of dividing each unit area into a low light region or a high light region by using the brightness of image data contained in said each unit area;
    a second step of outputting statistical information from image data contained in at least one unit area divided into the low light region, and detecting and removing Poisson and photon counting noise on the basis of the statistical information, the statistical information being the mean of the unit area;
    a third step of detecting a motion pixel from the image data; and
    a fourth step of detecting and removing false color noise from the image data on the basis of the detected motion pixel and the statistical information,
    wherein the step of detecting and removing false color noise uses an area statistical value, the area statistical value determined as $|(x(i, j, t) - \bar{x}(i, j, t))^2 - \sigma^2(i, j, t)|$, wherein said $x(i, j, t)$ is a pixel value in coordinates $(i, j)$ when time is t,
    said $\bar{x}(i, j, t)$ is the mean of the unit area containing coordinates $(i, j)$ when time is t, and
    said $\sigma^2(i, j, t)$ is the variance in coordinates $(i, j)$ when time is t.

2. The method of claim 1, wherein the second to fourth steps are not performed with respect to image data contained in the unit area divided into the high light region.

3. The method of claim 1, wherein the second step comprises the steps of:
    detecting whether a first pixel containing uncorrelated noise in the Poisson and photon counting noise exists in the unit area by using the statistical information and a threshold; and
    removing the uncorrelated noise by applying a median filter to the first pixel.

4. The method of claim 3, wherein the step of detecting whether a first pixel containing uncorrelated noise in the Poisson and photon counting noise exists in the unit area by using the statistical information and a threshold detects that a pixel contained in the unit area is the first pixel, in the case the difference between a pixel value of the pixel and a median value of absolute deviation thereof is larger than the threshold.

5. The method of claim 4, wherein the median value of absolute deviation of the pixel is calculated as,
    median value of absolute deviation=median$\{|x(i, j) - \bar{x}(i, j)| | x(i, j) \in W\}$,
    wherein said $x(i, j)$ is a pixel value in coordinates $(i, j)$, and the $\bar{x}(i, j)$ is the mean of unit area W containing coordinates $(i, j)$.

6. The method of claim 3, wherein the second step further comprises the step of:
    removing correlated noise in the Poisson and photon counting noise in the unit area by applying an adaptive low pass filter to a second pixel adjacent to the first pixel.

7. The method of claim 1, wherein the fourth step comprises the steps of:
    determining first image data corresponding to a predetermined frame and determining image data corresponding to a frame inputted right after the predetermined frame as second image data;
    outputting a first area statistical value for each pixel of the first image data;
    outputting a second area statistical value for each pixel of the second image data;
    comparing the first area statistical value and the second area statistical value for said each pixel and selecting a pixel value of image data corresponding to a smaller value; and
    substituting a pixel value of the second image data with the selected pixel value.

8. A computer readable storage medium comprising computer-readable instructions which, when executed by a computer, perform a method for processing an image consecutively inputted per frame unit, the method comprising the acts of:

a step of segmenting the image into unit areas comprising a predetermined number of pixels;

a first step of dividing each unit area into a low light region or a high light region by using the brightness of image data contained in said each unit area;

a second step of outputting statistical information from image data contained in at least one unit area divided into the low light region, and detecting and removing Poisson and photon counting noise on the basis of the statistical information, the statistical information being the mean of the unit area;

a third step of detecting a motion pixel from the image data; and a fourth step of detecting and removing false color noise from the image data on the basis of the detected motion pixel and the statistical information, wherein the step of detecting and removing false color noise uses an area statistical value, the area statistical value determined as $$|(x(i,j,t)-\bar{x}(i,j,t))^2-\sigma^2(i,j,t)|,$$

wherein said $x(i, j, t)$ is a pixel value in coordinates $(i, j)$ when time is t, said $\bar{x}(i, j, t)$ is the mean of the unit area containing coordinates $(i, j)$ when time is t, and said $\sigma^2(i, j, t)$ is the variance in coordinates $(i, j)$ when time is t.

9. An image processing system for an image consecutively inputted per frame unit, the system comprising:

a computing device having a processor, a memory, and an executable application residing in the memory for processing an image consecutively inputted per frame unit, the executable application comprising:

a segment module segmenting the image into unit areas comprising a predetermined number of pixels and dividing each unit area into a low light region or a high light region by using the brightness of image data contained in said each unit area;

a spatial hybrid filter outputting statistical information from image data contained in at least one unit area divided into the low light region, and detecting and removing Poisson and photon counting noise on the basis of the statistical information, the statistical information being the mean of the unit area;

a motion detector detecting a motion pixel from the image data; and a statistical domain temporal filter detecting and removing false color noise from the image data on the basis of the detected motion pixel and the statistical information, wherein the statistical domain temporal filter uses an area statistical value, the area statistical value determined as $$|(x(i,j,t)-\bar{x}(i,j,t))^2-\sigma^2(i,j,t)|,$$

wherein said $x(i, j, t)$ is a pixel value in coordinates $(i, j)$ when time is t, said $\bar{x}(i, j, t)$ is the mean of the unit area containing coordinates $(i, j)$ when time is t, and said $\sigma^2(i, j, t)$ is the variance in coordinates $(i, j)$ when time is t.

* * * * *